(12) United States Patent
Mekyska

(10) Patent No.: US 8,126,751 B2
(45) Date of Patent: Feb. 28, 2012

(54) METHOD FOR ALLOCATING SYSTEM COSTS OF THE INFRASTRUCTURE OF A COMPUTER CENTER

(76) Inventor: Alexander Mekyska, Engelsbrand (DE)

( * ) Notice: Subject to any disclaimer, the term of this patent is extended or adjusted under 35 U.S.C. 154(b) by 1186 days.

(21) Appl. No.: 11/599,160

(22) Filed: Nov. 14, 2006

(65) Prior Publication Data

US 2007/0124162 A1     May 31, 2007

(30) Foreign Application Priority Data

Nov. 15, 2005   (DE) .......................... 10 2005 054 848

(51) Int. Cl.
*G06Q 10/00* (2006.01)
(52) U.S. Cl. ...................... 705/7.11; 705/7.22; 705/7.25
(58) Field of Classification Search ................. 705/7.11, 705/7.22, 7.25
See application file for complete search history.

(56) References Cited

U.S. PATENT DOCUMENTS

| | | | |
|---|---|---|---|
| 7,194,439 B2* | 3/2007 | Kassan et al. .................... | 705/51 |
| 7,325,234 B2* | 1/2008 | Smith ............................ | 718/104 |
| 7,693,993 B2* | 4/2010 | Sheets et al. ................... | 709/226 |
| 7,725,343 B2* | 5/2010 | Johanson et al. ................ | 705/8 |
| 2002/0166117 A1* | 11/2002 | Abrams et al. ................. | 717/177 |
| 2004/0216113 A1* | 10/2004 | Armstrong et al. ........... | 718/104 |
| 2006/0059032 A1* | 3/2006 | Wong et al. ...................... | 705/10 |
| 2007/0016432 A1* | 1/2007 | Piggott et al. ..................... | 705/1 |

OTHER PUBLICATIONS

Chapter 19, "Job Costing and Modern Cost Management Systems" downloaded from http://www.principlesofaccounting.com/chapter%2019.htm (1 of 28)Aug. 6, 2010 5:09:14 PM and available online since Nov. 23, 2004.*
Woods, Mike "Cost Allocation and Pricing" from the Commonwealth Competitive Neurtrality Complaints Office of Australia—Oct. 1998.*
http://web.archive.org/web/*/http://www.principlesofaccounting.com/chapter%2019.htm (1 of 2)Aug. 6, 2010 5:08:03 PM.*

* cited by examiner

*Primary Examiner* — Romain Jeanty
*Assistant Examiner* — Mark Fleischer
(74) *Attorney, Agent, or Firm* — The Webb Law Firm

(57) ABSTRACT

A computer-implemented method for allocating system costs of an infrastructure of a computer center includes the steps of: determining total pro rata temporis costs of individual system resources of the infrastructure for a billing period; dividing the total pro rata temporis costs of individual system resources into individual performances by a key; dividing the individual performances into individual performance shares for one service each, such that the division corresponds to a percentage share of the individual performance actually used by one service each; adding up for one service each for one system resource each the individual performance shares, thereby providing performance share sums; and adding up the performance share sums, which have been formed each for the same service but different system resources.

11 Claims, 2 Drawing Sheets

METHOD FOR ALLOCATING SYSTEM COSTS OF THE INFRASTRUCTURE OF A COMPUTER CENTER

Figure 1:
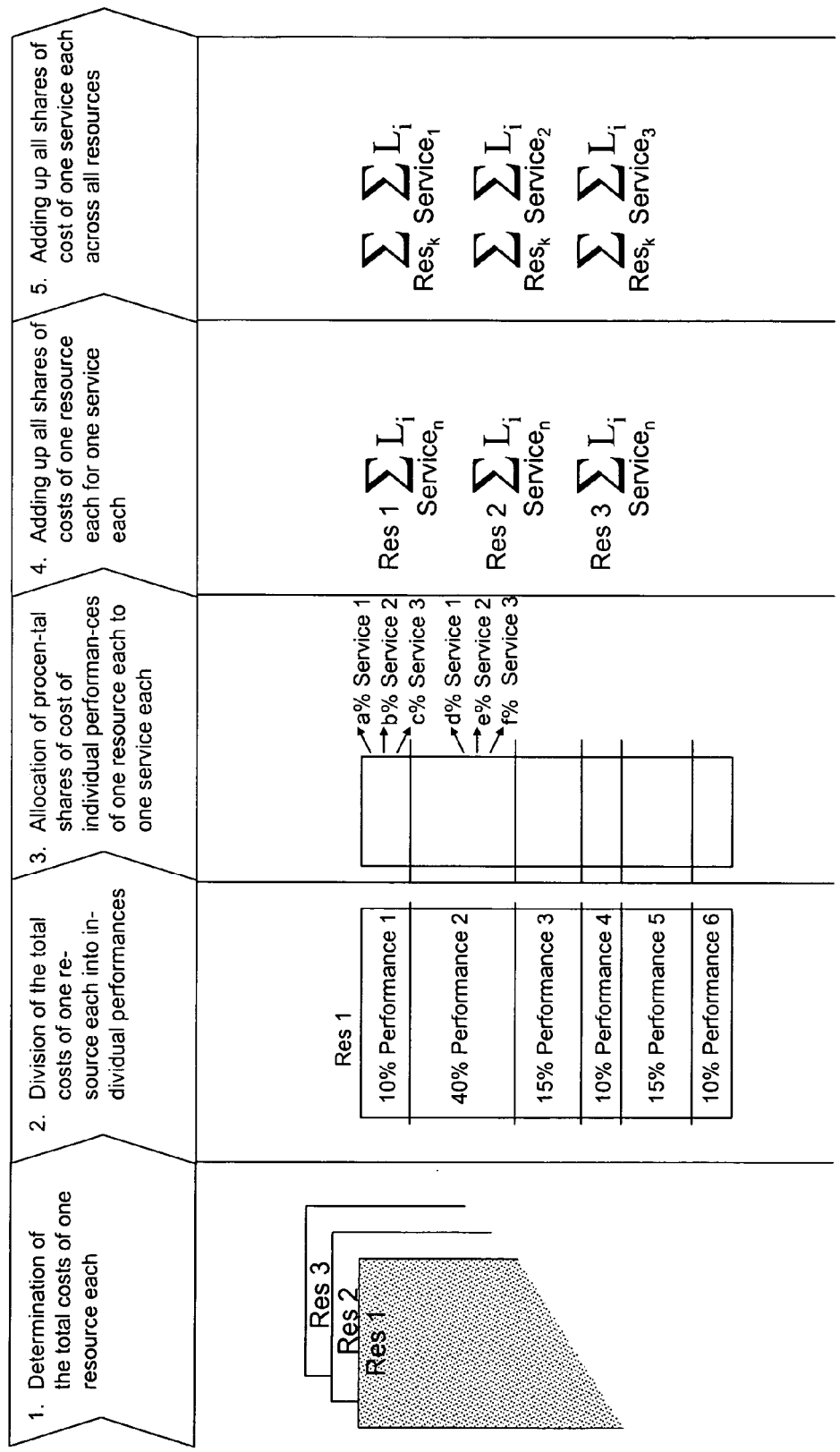

The invention relates to a method for allocating system costs, in particular those of the infrastructure of a computer center.

The present invention serves for the solution of an operational problem in the field of business accountancy. In cost center accounting, the costs structured with respect to type of costs are combined in cost units according to classification criteria, that means, for example, according to the location where they have accrued or their use. By this process, the total costs belonging to one classification criterion can be allocated to a department or enterprise, and in this manner, operating costs are allocated to certain enterprises or departments. Equally, the total costs of certain operational functions, for example of distribution, personnel administration or another internal function, can be combined in one or several cost units.

The information demand of corporate controlling, however, is not restricted to the knowledge, for example, of the complete personnel expenses of a department or the total costs of distribution. At the end of the cost accounting process, the original costs of the products or the individual services should rather be identified. The products or the individual services of the enterprise are displayed in the cost accounting as cost units. For the determination of the original costs of the products or the individual services, it is therefore necessary to allocate the costs of personnel and physical resources made use of for the provision to the respective product or the individual service. This is true for costs of resources made use of in the enterprise that can be directly allocated to the product or the individual service, as well as for costs of resources serving the manufacture of several products or that are made use of in several services.

If the costs for the manufacture of several products or for the provision of several services for resources made use of in the enterprise are cumulated in one cost unit, there is the cost accounting problem of the division and allocation of these costs to the individual products or the individual services, respectively, of the enterprise. One example is the common utilization of machines for several products of an enterprise or the use of the infrastructure of a computer center for various services of an enterprise. Another example is the utilization of the motor vehicle pool of an enterprise, where the degree of utilization of the motor vehicle pool by different products and services can vary. If the degree of utilization of the machines, the infrastructure of a computer center, the motor vehicle pool or other resources within the enterprise by the individual products or services varies or if only parts of the machine, the infrastructure of a computer center, the motor vehicle pool or other resources are made use of by the different products and services, here the concrete problem arises that, from an operational point of view, less costs have to be allocated to a product or a service that uses the machine or the infrastructure of a computer center less than to a product or a service that uses the same machine or the same infrastructure of a computer center to a much greater extent.

At present, it is usual to always rely on cost or turnover values to this end. When the costs are used as reference quantity, first the material and production costs as well as all other costs that can be directly allocated to the product or the service, such as for example full-time equivalent (FTE), are allocated to the product or the service. These costs are divided by the sum of all provision costs determined in the same manner and multiplied by the cost pool to be divided. As a result, one obtains the share of the distribution costs the individual product or service has to bear as cost pool. This procedure implies that a product or a service with higher costs also binds more resources in distribution and therefore has to bear a higher share of distribution costs. Instead of the costs, as a division criterion, one can also consult the turnover of the individual products or the individual services. The division method remains unchanged in this case, the original costs of the products or the service differ in the two methods. This, however, is unsatisfactory as in both cases the same facts of the case are the basis. This example shows that the use of different reference quantities from the same facts of the case lead to different results in the determination of the original costs, the actual use of the internal resources not being taken into consideration. As the original costs and the sales proceeds of the products have an influence on profitability assessment, the selected method of cost allocation is of existential importance for the enterprise. In operational accountancy, these parameters are compared and form the basis of decisions of the management who decide on the production or provision process, the continuation or abandonment of the production of the product or the provision of the service. The difficulty with different approaches leading to different charging of costs for individual products or services of an enterprise can always be overcome if all costs that can be allocated directly to the product or the service are based on units that can be directly compared. Units mean, for example, rendered man-hours as full-time equivalents or material costs in monetary units. However, the problem becomes complicated and not always easy to solve if the contribution to a product or to a service consists of different performances that can only be measured with different units.

It is therefore an object of the invention to link the utilization information of internal resources, in particular the infrastructure of a computer center, which are present in different measured quantities, such that the costs of a resource can be allocated to individual products and/or services according to causation.

The object according to the invention is solved by a method for allocating system costs, in particular those of the infrastructure of a computer center, consisting of at least one first step in which the total pro rata temporis costs of individual system resources of an infrastructure are acquired for a billing period, at least one second step in which the total costs of individual system resources are divided into individual performances by a key, at least one third step in which the performances determined in the second step are divided into individual performance shares for one service each, with the proviso that the division corresponds to the percental share of the performance actually used by a service, at least one fourth step in which the performance shares determined in the third step are added up for one service each for one system resource each, and at least one fifth step in which the performance share sums of the fourth step that have been formed each for the same service but for different system resources are added up, wherein the individual steps one to five can also comprise common intermediate steps for optimization. The common intermediate steps for optimization are common intermediate steps of the data processing technique necessary for performing and optimizing arithmetic operations, such as for example buffering or reading out and utilizing arithmetic results from previous arithmetic operations to avoid redundant arithmetic operations. This is in particular true for the division of the costs according to a key. This does not have to be repeated for each process but can be performed once, and subsequently, the results of this procedure step can be reused in the following allocations.

It is one advantage of the method according to the invention that the cost allocation to be performed on the basis of different performances is performed by dimension-less performance shares. It is thus avoided that different performances that cannot be associated with one another due to a different unit of measure have to be associated with one another.

Before further advantageous embodiments of the invention will be described, the method according to the invention will be described in greater detail and concretized by way of example at this location. By way of example, but without restricting the idea of the invention, the share of cost of individual products or individual services in the infrastructure of a computer center can be determined with the method according to the invention.

The infrastructure of a computer center does not only consist of a central arithmetic unit but usually comprises a considerable number of different individual data processing systems and peripheral units which can all by themselves also cause considerable costs. Due to the universal usability of the infrastructure of a computer center, it is possible that for one product or for one service, the resources of the infrastructure of the computer center are made use of to a different extent. By way of example, a service or the production of a product can be very compute-bound, another service or production of a product can be very memory-bound. Other services or production processes for a product in turn can to a great extent primarily make use of the communication infrastructure of the computer center and make almost no use of the storage capacity. Here, there is a considerable variability. The individual system resources can be optimized such that the intensively used system resources are made available by high-performance system resources, and that other, less used system resources are made available by less powerful system resources. If now a service or the production of a product to a considerable extent requires a system resource that was up to then only little used so that the replacement by a more powerful system resource is necessary, this investment can be allocated to all services and/or products according to causation, without, due to allocation of cost not according to causation, higher costs being billed to those services or those products that were not subject to any change before and after the optimization.

The particularity of many computer systems is that a computer system can solve various tasks apparently in parallel. Indeed, in practice the problems are subdivided into many individual problems with a low degree of complexity, and each partial solution is only processed for a limited period, and thus the computer processes different problems sequentially one after the other in small time slots. As a result, the problems solved with the aid of the computer are apparently processed in parallel. This approach turned out to be particularly advantageous because a computer often has to spend long waiting times for activating hard disks, magnetic tape drives or for setting up a network connection. A long waiting time here means long in relation to the time required for the processing of a partial problem. Here, it is absolutely common that such waiting times take several seconds during which further partial steps of another problem can be solved. If the partial problem of another problem has been solved, the computer can access the periphery to be activated and thus the computer has spent valuable system time during the waiting time for providing billable computer performances instead of wasting system time that cannot be billed as waiting time. As an alternative, it would be also possible to completely process the problems to be solved by means of the computer one after the other, however, then no problem will be solved in the waiting times, so that the time for sequential processing, that means processing one after another, of arithmetic problems is essentially longer than in the apparent parallel processing of various problems one next to another.

However, just in this above-described apparently parallel processing, the problem of the cost allocation for various performances the system has to provide is shown. If several programs, which will be referred to as services below, are processed simultaneously on a relatively large computer, it is not easy to clearly allocate the utilization of the periphery and the computer to each service. For example, it is possible that a service actually runs on several computers, for example in the consolidation of relatively large annual accounts, and by this, network connections are often set up from one computer to other ones. Other services can in turn be programmed such that these preferably perform many operations on the mass storages, that means, for example, the hard disk. Here, it is essential whether, for example, the individual calculation steps are performed in many individual hard disk operations, or whether a hard disk operation is employed economically, and all data are written onto the hard disk only in one large concerted step. Experience showed that the wear of mass storages at a high mechanical load, that means with many individual operations, is by far higher than in case of rare loads, where the number of stored data can be the same in both cases. However, not only the different use of hard disks or magnetic tape drives challenges the employed system resource to varying extents. Equally, when using network connections for example over long distances, it is usual to bill the actual network utilization on the basis of the actually transmitted data and the individual actually set up data connections. Apart from this, however, there is a plurality of further peripheral system units that can be used by a service to a varying extent, where the peripheral physical units can make up considerably high costs in the overall investment of a computer as a system resource of a computer center.

The method according to the invention now permits to allocate the total costs for a computer, as system resource of a computer center, to individual services in a quantifiable manner and according to causation. To this end, the total pro rata temporis costs of the infrastructure of individual system resources are determined for a billing period in a first step according to the invention. This means that the pro rata temporis costs for example of peripheral physical units, such as, for example, printer, network connection, disk drives, network maintenance structure as well as for example uninterrupted power supplies, are acquired. Here, it is common that the overall lives of various peripheral physical units vary. In the determination of the pro rata temporis costs, thus the total costs of the system are divided corresponding to the relation of the billing period to the overall life of the individual assembly. This first step according to the invention can be performed by taking data for example from an ERP (Enterprise Resource Planning) system where operational data are stored and maintained in a separate computer system. To this end, the system that performs the method according to the invention requests from an ERP system the data of the individual assemblies containing the total costs and the overall life and possibly further parameters, such as, for example, the fiscal depreciation modality. It is, for example, possible to depreciate the investment in a system resource on a straight-line basis or else on a reducing-balance basis. As a consequence, in the different billing periods, a different pro rata temporis cost pool of the respective infrastructure can be formed.

According to the invention, in the at least second step, the cost shares of individual performances of a resource are divided by a key. The key is the only input parameter that has to be determined independently in an external step. Just with integrated system resources that can be further subdivided into different sub-resources, this decision is necessary. By way of example, a system resource is mentioned which mainly makes available mass storages. Such a system resource nevertheless comprises all common peripheral elements that are also comprised by other assemblies or system resources. A performance of this system is thus the provision of mass storage and could, for example, make up a share of 90% of the total costs of the system resource. Another exemplary system resource could however provide storage space as well as communication services. This system resource could comprise an exemplary division of 40% of the total costs for mass storages and 60% of the total costs for communication services. It is here up to the person skilled in the art to optimally divide the integrated system resources to permit an allocation of system resources as far as possible according to causation.

According to the invention, in the at least third step, the shares of cost determined in the second step are again divided corresponding to the performance shares of individual performances of a resource made use of by a service. By this further division, a share of cost of a performance of a system resource for a service is obtained.

In the at least fourth step, the shares of cost determined in the third step are added up for one service each. By this, the total share of cost of all performances of one single system resource are obtained for one service.

In the at least fifth step, the sums of the fourth step that had been formed for different system resources and each made use of by the same service are added up. Thus, one obtains the system costs of a service, so that these system costs can be allocated to the one service directly.

The advantage of the whole system is that for adding performance shares only costs are used, and no individual unit of measure has to be used for the respective system resource or sub-resource, such as, for example, the number of transmitted data, the number of write and read cycles, the amount of written data, the number of printed pages of paper or other uses of peripheral units not listed here.

That means, by the method according to the invention it is achieved that a service, a program processed on different system resources (computers) can be billed according to causation and in a quantifiable manner. In contrast to methods common up to now where other allocation keys were used, this method operates almost absolutely according to causation and also offers an incentive for the bearer of the various costs to optimally utilize the system.

In a further advantageous embodiment of the invention, system performance data generated by the operating system of the data processing equipment are used as individual units of measure for the individual performances of a system resource.

Many operating systems, precisely of computers, but also of programmable machines, already offer a great amount of data suited for being used in the method according to the invention. Thus, it is for example known to provide data on the utilization of individual peripheral modules in groups. By way of example, the number of transmitted and the number of received data bytes, the number of performed write and read cycles, the number of actually written and read-out data, the time of CPU seconds, the time of programs in the computer, and many other system-typical parameters are mentioned. These data are usually provided by means of the SNMP protocol (Simple Network Maintenance Protocol). These system performance data are often used for assessing the integrity of the computer from outside. Here, often heuristic methods are relied upon which determine by plausibility checks whether a computer system is still in a desired and stable state, or whether the computer system possibly does not operate properly due to faulty programming or malfunction and thus causes costs without solving problems and generate the desired data in a desired manner. These so-called system performance data, however, are not only suited for monitoring system integrity. According to the invention, these data are also suited for performing cost billing of individual services processed on several, or only on one system resource, and this according to causation and in a quantifiable manner.

In a further advantageous embodiment of the invention, ERP data are used to obtain the pro rata temporis costs of the infrastructure of individual system resources for executing the method.

The system executing the method according to the invention thus establishes data from various sources and combines them to a quantifiable cost accounting according to causation. Thus, one obtains data from the ERP system which permit conclusions to the pro rata temporis costs of the infrastructure, and these are used to determine, together with the share of the performance provided by one infrastructure each, the pro rata temporis cost pool for one infrastructure each.

According to the invention, the method for allocating system costs of a data processing system is performed by a computer software for allocating system costs of a data processing system or a whole data processing cluster. This computer software is characterized in that the software comprises a first program interface to the operating system of the system resources to be rated via which system performance data can be input. Moreover, the computer software comprises a further program interface to an ERP system from which the pro rata temporis costs of the system resource concerned can be read out.

That means, the computer software which is to perform the cost accounting according to the invention takes its data from several independent sources. A first source represents the operational software of an enterprise, in most cases ERP systems, however, it is also possible to fall back on other operational data made available by a database, instead of the ERP systems. In the context of this patent application, ERP software means all software comprising operational data and from which operational data can be taken. The program interface with which one can access the system performance data of individual system resources is advantageously an SNMP interface. However, it is also possible to use any other protocol for reading out system performance data. The use of SNMP data is advantageous because they are made available on many systems. A limitation to SNMP data, however, is not necessary according to the invention. Most operating systems make available special programs, so-called agents, disposing of highly system-specific routines to make available the condition of the individual assemblies of the data processing system. These data are made available by this program in the respective data processing unit at the network interface by means of the SNMP protocol. In the process, system-specific agents can be used, or else programs individually set up for the program according to the invention can be employed to provide the system performance data.

In an advantageous manner, the program for determining the system costs runs on a separate computer connected to the network via which all computers and information to be rated are accessible and can be queried. This central computer processes the program which collects the data from other computers, that means in particular the system performance data, and allocates them with the aid of the data from an ERP system according to the method according to the invention. In the process, the data can be stored in a remote ERP system, or it is also possible that the data stored for calculating the pro rata temporis costs are stored in the program for calculating the system costs itself.

In an advantageous manner, a database is used for implementing the program into which the individual system performance data are written and with the aid of which all further necessary steps and buffering of data are performed.

In an advantageous embodiment of the computer software according to the invention, the same comprises an interface for interactively controlling the calculation of system costs. This makes it possible to possibly take corrective actions in the software in case of errors or to provide the software with the system data at the right time or with the necessary authentication parameters by inputting manual control commands. This ensures that the software for calculating the infrastructure does not intervene in the performance of the system resources in an undesired manner, but that the calculation can be started and stopped at any time by manual control.

The method according to the invention, however, can not only be used for allocating system costs of a computer center, but also for other operational process cost calculations. By way of example, machinery where different products are worked with partially overlapping machine processing can be allocated in this manner. This is in particular true for differently configured processing by robot lines, but motor vehicle pools that provide the transport of very heavy goods over a short distance, the transport over longer distances, factual storage of products in a trailer or else the delivery of individual documents as service in an enterprise as an integrated system resource can also be allocated in this manner. It is up to the person skilled in the art to formulate applications of the method according to the invention for the internal allocation of activity costs and system costs.

In a further advantageous embodiment of the method according to the invention, between the at least first step and the at least second step, a further intermediate step is inserted in which the total pro rata temporis costs of individual resources are allocated to individual logical units. By this intermediate step, those system resources can also be allocated which are only virtually offered in an actual system resource. By way of example, a logical server is mentioned which is provided on an actual server. Several logical system resources are often operated on system resources in parallel, so that it is not transparent for programs whether they run in the environment of an individual computer or in a virtual environment of a computer. Among them are not only operating system emulators, but also Web servers running in several entities or other program environments which in turn offer their services to other program environments. In this intermediate step, the values thus distributed to the individual logical units are used as input parameters for the at least second step, in which the costs are divided into individual performances by a key.

The method according to the invention and the software according to the invention are absolutely suited for the use in heterogeneous software landscapes. By a modular structure it is possible to integrate the software in existing system management tools, for example for an IT overall controlling. To this end, the software according to the invention comprises interfaces to ERP systems on the one hand, but also to the above-mentioned system management tools on the other hand.

The method according to the invention will be illustrated again with reference to an example.

In the drawings

Figure 2:
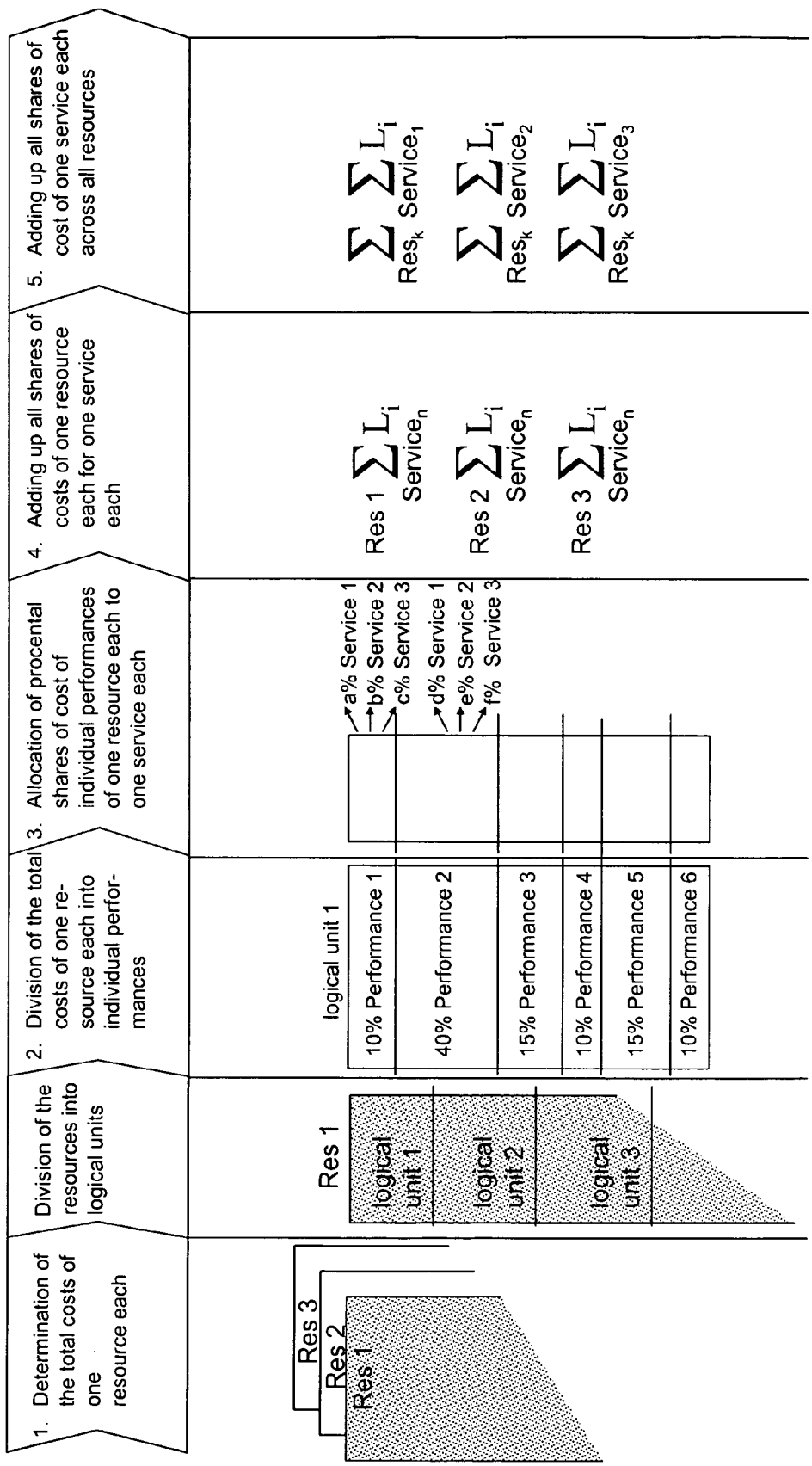

FIG. 1 shows an illustrated flowchart of the method according to the invention, and FIG. 2 shows an illustrated flowchart of the method according to the invention in one embodiment.

In FIG. 1, a flowchart of the method according to the invention for allocating system costs is shown. Starting with the at least first step 1, the total pro rata temporis costs of one system resource each are determined. These data can be provided from an ERP system and the pro rata temporis costs can be formed during the fiscal year, after the fiscal year or else after the fiscal asset depreciation range, as long as the different fiscal asset depreciation ranges result in depreciations of different amounts.

If the total pro rata temporis costs of one system resource, for example for system resource R1, have been determined, these total pro rata temporis costs are divided according to a key according to the at least second step 2, so that 100% of the costs are allocated to individual performances, in this example performance L1, L2, L3, L4, L5 and L6. However, it is also possible that this division does not have to be performed if it is a system resource making available one single performance. The necessary key for cost allocation then correspondingly leads to a complete allocation of the total costs to one performance. The division percentally divides the total pro rata temporis costs of one system resource, where always 100% of the total pro rata temporis costs are allocated to individual performances. It is true that an external parameter is introduced thereby, however, this is necessary to allocate integrated system resources that can not be divided any more as to their costs and can provide a plurality of different performances, corresponding to the actual use of performances, i.e. according to causation. In the system resources mentioned above by way of example which only provide one single performance, this division is not necessary. For example, one can mention network components which provide the same performance for different services.

In the at least third step 3, the shares in the total pro rata temporis costs determined in the at least second step 2 are divided again by allocating the percental performance shares LA1D1, LA1D2, LA1D3, LA2D1, LA2D2, LA2D3 to individual services, that means in this example D1, D2 and D3. In FIG. 1 under step 3, the numbering means in each case the percental performance share of performance 1 (LA1) provided for service D1 (D1). For further combinations of different performance shares of different performances and different services, the subscripted number changes correspondingly. As intermediate result one obtains in this third step 3 the pro rata temporis share in the total costs divided according to service and system resource. These percental performance shares of individual performances are designated with LAi under step 4 in the flowchart, i standing for different performances as variable designation.

In the at least fourth step 4, the percental performance shares LAi of different performances from the at least third step 3 are added up for one service each for one system resource each, here by way of example service D1 and system resources R1, R2 and R3.

In the at least fifth step 5, the performance share sums of the at least fourth step 4 are again added up, in step 4 the added up percental performance shares being added up for the same service across all resources. As a net result, one obtains here the cost shares a service has caused by using performances at all system resources. These cost shares are to a great extent allocated according to causation.

These cost shares represent directly allocatable costs for individual services that can be used for the allocation. A relation of service or product of the enterprise to a service is achieved in that a service is only provided for one service or only for one product.

The method is illustrated and used by a logical sequence of individual steps. It is here up to the person skilled in the art to select common mathematical reductions or operational sequences that possibly avoid or optimize necessary intermediate steps for buffering data or for a simpler summation or formation of quotients.

In FIG. 2, a flowchart comparable to FIG. 1 is shown, where an additional intermediate step between step 1 and step 2 in FIG. 1 has been inserted. Here, the total costs of one resource each are allocated in addition to individual logical units stored on an actual resource before the division of the total costs of one resource each. This means that a computer which, for example, provides several operating systems simultaneously or offers more than one operating system environment is subdivided into several logical units. In the process, the costs subdivided in this manner are used in the following step as costs of the logical unit instead of costs of the actual resource.

The invention claimed is:

1. A computer-implemented method for allocating system costs applicable on every part of an infrastructure of a computer center, wherein the infrastructure includes at least one peripheral device and at least one arithmetic unit, the method performed on at least one computer having a computer readable medium having stored thereon instructions, which, when executed by a processor of the computer, causes the processor to implement the method, comprising:
   determining, on the processor of the computer, total costs in proportion several parameters of individual system resources of the infrastructure for a billing period, wherein the total costs include a cost for the at least one peripheral device that is determined based on a specific usage of a service for which the at least one peripheral device is used;
   dividing, on the processor of the computer, the total costs in proportion several parameters of individual system resources into cost shares of individual performances of system resources by a key;
   dividing, on the processor of the computer, the cost shares of individual performances of system resources into individual performance shares of system resources made use of by individual services, such that the division corresponds to a percentage share of the individual performance of a system resource actually used by an individual service;
   adding, on the processor of the computer, the individual performance shares for each service for each system resource, thereby providing performance share sums; and
   adding, on the processor of the computer, the performance share sums, which have been formed each for the same service but different system resources.

2. The method according to claim 1, wherein the cost shares of individual performances of system resources are determined from data generated by an operating system of data processing equipment of the infrastructure.

3. The method according to claim 2, wherein Simple Network Maintenance Protocol (SNMP) is used for reading out the system performance data.

4. The method according to claim 1, wherein Enterprise Resource Planning (ERP) data is used for determining the total costs in proportion to several parameters of individual system resources of the infrastructure.

5. The method according to claim 1, wherein a database in a separate system is used for calculating the total costs in proportion to several parameters of individual system resources.

6. The method according to claim 1, wherein the system performance data is made available to at least one computer of the computer center via a network protocol.

7. The method according to claim 1, wherein SNMP protocol is used for querying system performance data from the individual system resources.

8. The method according to claim 1, further comprising: allocating the total costs in proportion to several parameters of the individual system resources to individual logical units of the system resources after the total costs in proportion to several parameters are determined, wherein the total costs in proportion to several parameters allocated to the logical units are used as input values for the at least second step.

9. A computer readable medium having control logic stored therein for causing a computer to allocate system costs of an infrastructure of a computer center, the control logic comprising:
   first readable code means for determining total costs in proportion several parameters of individual system resources of the infrastructure for a billing period, wherein the total costs include a cost for at least one peripheral device of the infrastructure of the computer center that is determined based on specific usage of a service for which the at least one peripheral device is used;
   second readable code means for dividing the total costs in proportion to several parameters of individual system resources into individual performances by a key;
   third readable code means for dividing the cost shares of individual performances of system resources into individual performance shares of system resources made use of by individual services, such that the division corresponds to a percentage share of the individual performance of a system resource actually used by an individual service;
   fourth readable code means for adding the individual performance shares for each service for each system resource, thereby providing performance share sums;
   fifth readable code means for adding the performance share sums, which have been formed each for the same service but different system resources;
   sixth readable code means for providing a first program interface to an operating system of the individual system resources via which system performance data are input; and
   seventh readable code means for providing a second program interface to an Enterprise Resource Planning (ERP) system from which the total costs in proportion to several parameters of the individual system resources are read out.

10. The computer readable medium according to claim 9, wherein a user interface for interactively controlling system cost allocation is provided.

11. The computer readable medium according to claim 9, wherein an SNMP protocol is implemented for a query of system performance data of a data processing systems to be rated.

* * * * *